Figure 1:
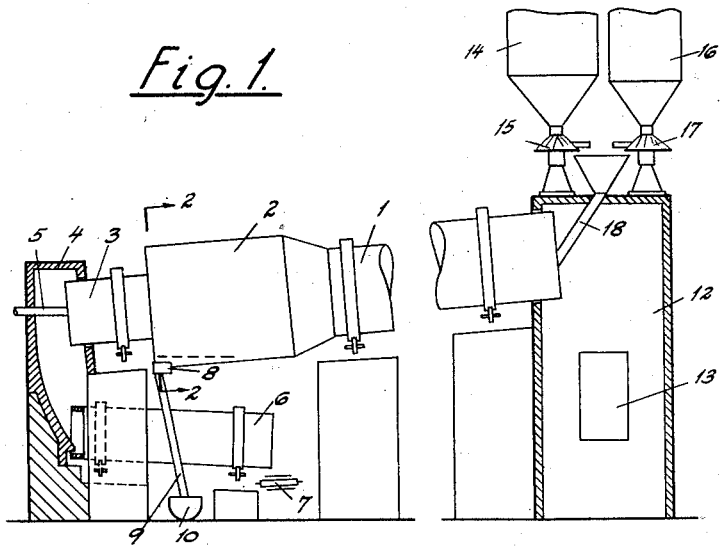

March 3, 1942.   M. VOGEL-JORGENSEN   2,274,946

TREATING METALS

Filed Jan. 27, 1940

Patented Mar. 3, 1942

2,274,946

UNITED STATES PATENT OFFICE 2,274,946

TREATING METALS

Mikael Vogel-Jorgensen, Frederiksberg, near Copenhagen, Denmark, assignor to F. L. Smidth & Company, New York, N. Y., a corporation of New Jersey Application January 27, 1940, Serial No. 315,922
In Great Britain February 4, 1939

3 Claims. (Cl. 75—43)

This invention relates to the melting and refining of metal—especially scrap metal—of the iron group, that is to say, iron, steel, chromium, nickel, manganese or cobalt, or any alloy consisting predominantly of one or more of these metals. The invention is especially concerned with the problem that arises when the scrap is in the form of chips or other small pieces. These cannot be melted down in a cupola, because they would choke it. Even if the small pieces are formed into briquets, the results are not very successful. Further, in the case of steel very high temperatures are needed, and these cannot easily be obtained in an ordinary furnace.

According to the present invention, the necessity for briquetting or other pre-treatment of the metal to be melted and refined is avoided by introducing the chips or other small pieces into a rotary kiln having a length substantially greater than that of the flame zone, such as a kiln of the kind used for burning cement. The pieces of scrap pass down the kiln in countercurrent to the flame and products of combustion. The process is continuous, in that fresh pieces are regularly fed into the kiln, and is thus essentially different from processes in which batches of iron are refined in short drum furnaces, so short that a flame entering the furnace at one end extends through substantially the whole length of the kiln, and the charge is treated as a whole and then discharged.

It is preferred not merely to introduce pieces of scrap metal into the kiln, but also slag-forming materials, which may or may not themselves be melted, so that the metal is refined in the kiln, the metal and slag being discharged separately from the kiln. These slag-forming materials preferably are cement raw materials. In general, the temperatures attained in rotary kilns in which cement is being burnt are high enough to melt scrap metal, and therefore the metal may be melted and refined in such kilns simultaneously with the burning of cement. The refining effect of the slag is much promoted by the nature of the action inside a rotary kiln, which ensures intimate mixing of the materials in the kiln.

It is found that cement absorbs a substantial part of the sulphur content of the iron or steel and reduces the silicon content.

The small pieces of scrap metal may conveniently be added to cement raw materials before they enter the kiln. If these are cement raw materials prepared by the dry process, the chips or small pieces may be mixed with the materials at such a stage that they assist in the transformation of the materials into the nodular form in which they are usually burnt. However, it is to be understood that the iron or steel may, if desired, be mixed with the raw materials at any stage in the preparation of them, the invention being in no way dependent upon any particular method of preparing the raw materials.

The amount of scrap metal that may be treated in a kiln in which cement is being burnt depends both on the purity of the metal and on the nature of the raw materials that are being burnt in the kiln. If the metal that is being refined is ordinary cast iron and the kiln is burning ordinary Portland cement, it is found possible to add an amount of cast iron equal in weight to the cement raw material. The scrap metal may advantageously be added to the kiln continuously.

It may happen that some of the scrap metal available is in the form of pieces that are not small enough; for example it may include scrapped articles or broken castings. These may be converted into a suitable form by being melted outside the kiln, for example in a cupola furnace, and then cooled in such a way that small pieces are formed.

As a rule scrap metal is very heterogeneous, and the process according to the invention allows of the production of a homogeneous product from the heterogeneous scrap in a particularly advantageous way.

Some scrap metals, particularly steel, have melting points so high that it is not convenient or feasible to attain the necessary high temperatures in the kiln. In general, the maximum practical working temperature is 1400° C. to 1500° C. Scrap metal having a melting point above this may be treated in accordance with the invention by introducing carbon into the kiln with the metal to lower the melting point. For example, when pieces of steel or low-carbon iron are being treated, so much carbon should be added as to raise the carbon content of the molten charge in the kiln to that of normal cast iron.

The flame used for heating may be of the kind produced in cement kilns. It should be almost neutral in character, so as to prevent oxidation of the molten metal.

The accompanying drawing illustrates apparatus in which the process of the invention may be carried out.

Figure 2:
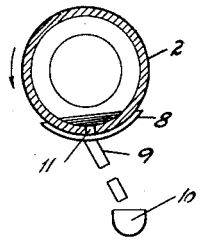

In the drawing, Fig. 1 is a side view of a rotary kiln, partly in section, in which the process of the present invention may be carried out, and Fig. 2 is a section on line 2—2 of Fig. 1.

Figure 1 shows a rotary kiln 1, to the inlet end of which cement raw materials are supplied through a chute 18 from a silo 16 through the medium of a feeding table 17. The silo 16 and the feeding table 17 are more particularly intended for dry cement raw materials, but wet cement raw materials may be supplied to the rotary kiln in any known manner. Cast iron chips are supplied to a silo 14 and fall from this on to a feeding table 15 from which they are discharged into the chute 18. At the discharge end 3 of the kiln, there is a hood 4 through which a burner pipe 5 passes. Air and pulverized coal are supplied to this pipe and burn to form a flame in the discharge end 3, where the temperature is about 1400° C. to 1500° C. The gases from this combustion pass up the kiln and flow out of it into a dust chamber 12, from which they pass through a flue 13.

The cast iron is heated with the cement material as it passes down the kiln 1, and by the time it reaches an enlarged zone 2 the temperature is about 1400° C. to 1500° C., so that it is molten and collects in this enlarged zone, as shown by the dotted line in Figure 1 and in Figure 2. The slag formed by the cement materials as these are heated and burnt to clinker collects undesired constituents such as sulphur from the iron during the travel of the iron and slag down the kiln. Further, in the widened zone 2, the slag covers the molten iron and forms a protecting layer over it. The molten iron is discharged through a hole 11 into a hopper 8, which surrounds part of the underside of the kiln and which in turn delivers the molten iron through a pipe 9 into a container 10. The discharge is, of course, intermittent, because iron can only flow through the hole 11 once during each revolution of the kiln, that is to say, when the hole is beneath the molten iron, but the discharge may be made substantially continuous by providing more than one hole 11. The cement itself passes onwards through a part 3 of reduced diameter and is delivered into a cooler 6 in the usual way. From this cooler the slag is discharged onto a conveyer 7. It will be seen that the air drawn in through the rotary cooler 6 for cooling the slag may in the usual way be used as preheated secondary air in the rotary kiln, but part of it may also be removed from the hood 4 to be used as primary air in the burner or for other purposes.

It will be understood that the rotary kiln may be provided with any kind of heat-transmitting elements such as chains, plates or the like in order more effectively to transmit the heat from the combustion gases to the material to be treated. In the same way any suitable kind of preheater such as a travelling grate, an inclined grate, a rotary drum or the like may be used.

I claim:

1. The process of simultaneously melting and refining cast iron and forming cement clinker which comprises introducing cement raw materials and substantial amounts of scrap cast iron into a rotary kiln having a flame zone whose length is substantially less than that of the kiln so that the cement raw materials and the cast iron pass through the kiln countercurrent to the products of combustion and are thereby heated until the maximum temperature is reached in or near the flame zone, whereby melting and refining of the cast iron and burning of the cement raw materials takes place, performing the refining of the cast iron in its entirety during passage of the metal through the rotary kiln, discharging the refined metal in the molten state near the flame zone, and separately discharging the cement clinker at the flame zone end of the kiln.

2. The process of simultaneously melting and refining cast iron and forming cement clinker which comprises introducing cement raw materials and substantial amounts of scrap cast iron into a rotary kiln having a flame zone whose length is substantially less than that of the kiln so that the cement raw materials and the cast iron pass through the kiln countercurrent to the products of combustion, firing the kiln so that the cast iron is melted and brought to a temperature of about 1400° C. to 1500° C., whereby refining of the molten metal and burning of the cement raw materials takes place, performing the refining of the cast iron in its entirety during passage of the metal through the rotary kiln, discharging the refined metal in the molten state near the flame zone, and separately discharging the cement clinker at the flame zone end of the kiln.

3. The process of simultaneously melting and refining cast iron and forming cement clinker which comprises introducing cement raw materials and an amount of scrap cast iron substantially equal to the amount of cement raw materials into a rotary kiln having a flame zone whose length is substantially less than that of the kiln so that the cement raw materials and the cast iron pass through the kiln countercurrent to the products of combustion and are thereby heated until the maximum temperature is reached in or near the flame zone, whereby melting and refining of the cast iron and burning of the cement raw materials takes place, performing the refining of the cast iron in its entirety during passage of the metal through the rotary kiln, discharging the refined metal in the molten state near the flame zone, and separately discharging the cement clinker at the flame zone end of the kiln.

MIKAEL VOGEL-JORGENSEN.